United States Patent
Shimokoshi (10) Patent No.: US 7,110,203 B2
(45) Date of Patent: Sep. 19, 2006

(54) MAGNETIC DISK DRIVE IMPROVED IN A RELIABILITY OF DATA RETRIEVE

(75) Inventor: Masayoshi Shimokoshi, Odawara (JP)

(73) Assignee: Hitachi Global Storage Technologies Japan Ltd., Kanagawa (JP)

(*) Notice: Subject to any disclaimer, the term of this patent is extended or adjusted under 35 U.S.C. 154(b) by 68 days.

(21) Appl. No.: 10/231,268

(22) Filed: Aug. 30, 2002

(65) Prior Publication Data

US 2003/0193729 A1   Oct. 16, 2003

(30) Foreign Application Priority Data

Apr. 11, 2002   (JP) .............................. 2002-108669

(51) Int. Cl.
*G11B 27/36* (2006.01)
*G11B 5/09* (2006.01)

(52) U.S. Cl. .......................................... 360/53; 360/31
(58) Field of Classification Search ................. 360/53, 360/55; 707/205
See application file for complete search history.

(56) References Cited

U.S. PATENT DOCUMENTS

| 5,353,170 A * | 10/1994 | Fung et al. ............... 360/53 |
| 5,734,862 A * | 3/1998 | Kulas ....................... 711/157 |
| 6,205,419 B1 * | 3/2001 | Fiedler ..................... 704/201 |
| 6,288,862 B1 * | 9/2001 | Baron et al. ............... 360/55 |
| 6,600,614 B1 * | 7/2003 | Lenny et al. ............... 360/31 |
| 2001/0033444 A1 * | 10/2001 | Tomiyama et al. ......... 360/29 |
| 2002/0003675 A1 * | 1/2002 | Tomiyama et al. ......... 360/53 |

FOREIGN PATENT DOCUMENTS

| JP | 05-066999 | 3/1993 |
| JP | 06-338010 | 12/1994 |
| JP | 2002-025188 | 1/2002 |

* cited by examiner

*Primary Examiner*—Wayne Young
*Assistant Examiner*—Daniell L. Negrón
(74) *Attorney, Agent, or Firm*—Antonelli, Terry, Stout and Kraus, LLP.

(57) ABSTRACT

A magnetic disk drive improved in reliability of data retrieve. This invention prevents the drive from decoding already-written old data. The failure decoding is caused by a deviation in a write operation, by a malfunction of a writing head and so on. When data in a sector is renewed, the sector's location and renewal frequency information are saved not only in the sector of the disk media but also in a temporary memory. When the magnetic disk drive is in an idle mode, those renewal information written in the sector and stored in the temporary memory, are checked. If both renewal information match, the data is regarded "not old" and the information about the sector in the temporary memory is deleted. In the deleting operation, check mark information indicating that the written data has been checked is written in the sector of the magnetic disk medium.

20 Claims, 6 Drawing Sheets

MAGNETIC DISK DRIVE IMPROVED IN A RELIABILITY OF DATA RETRIEVE

FIELD OF THE INVENTION

The present invention relates to record and reproduce technique of a magnetic disk drive, and more particularly to a technique for preventing decoding old data.

BACKGROUND OF THE INVENTION

In general magnetic disk drives, positional information used to position a magnetic head is written in a servo area as servo information on a magnetic disk medium. Data information is written to areas, called sectors, between servo information.

The magnetic head senses servo information at certain time intervals, specifies the position of its track and/or its position in a radial direction while performing a sequence of positioning operations such as "following" and/or "seek".

The magnetic head comprises a combination type magnetic head in which an MR head using a magnetoresitive effect in reproduction and a thin film head using a thin film technique for coil production in record are mounted on corresponding sliders, respectively.

In data renewal, the magnetic disk drive generally uses a method of directly writing new data over old-written data without erasing the old data, which is referred to as "overwrite".

A. When data is to be renewed, it is important to accurately position the magnetic head at the center of the track. To position the magnetic head less accurately causes the respective positions of the already written data and new data to be written to deviate from their proper positions. In this case, a part of the old data, which is not renewed or updated by the new data, could remain present and be possibly decoded.

Most of positioning errors of the magnetic head which would occur due to various causes can be eliminated by the servo control circuit. However, with vibrations at a frequency higher than a sensing cycle of the servo information, the prior-art positioning errors can not be reduced. Therefore, it is very difficult to completely eliminate the remaining old data.

In order to solve this problem, JP-A-6-338010 has proposed a method of preventing old data decoding, by positioning a head at a plurality of different positions on a magnetic disk medium when data is to be decoded, and checking to see whether or not respective data to be decoded coincide.

In this method, 1) since the head is positioned at a plurality of different positions on the magnetic disk medium and the data are compared, the magnetic disk should be rotated at least twice and data reproduction time increases; and 2) this method is not effective for an abnormal operation and failure of the writing head.

B. With the complex magnetic head, there are the problems of an abnormal operation and a failure of the writing head. Old writing heads each comprise a ring-like magnetic core of high permeability and a coil wound around the core in which a current is caused to flow through the coil to produce a magnetic field, which writes information to a magnetic disk medium.

The causes of malfunctions in the writing head are 1) disconnection and short-circuits in the coils/current paths through which the currents flow, 2) corrosion of the writing head itself, physical/mechanical breakage of the writing head due to contact with the magnetic disk medium, and a deterioration in the performance of the magnetic core; and 3) an increase in the spacing between the writing head and the magnetic disk medium due to the depositing of foreign substances on the surface of the magnetic head facing the medium. These events greatly reduce the writing magnetic field, so that it is impossible to erase the old data completely by renewing the old data with new data or by writing new data over the old data.

In order to sense the state in which old data remains due to abnormality of the writing head, a history of data renewal in the location where the old data remains must be managed. To this end, it could be considered to use, for example, a method of mounting a semiconductor memory on the magnetic disk drive to thereby leave history information. According to this method, both the positioning errors on the writing head and abnormality of the writing head are eliminated. Writing and recording information to and from the semiconductor memory is performed at very high speeds and the processing time hardly increases.

JP-A-5-66999 discloses storing and managing management information on a cache management table of a RAM.

When data renewal information in all the sectors are to be stored in a semiconductor memory, however, the capacity of the semiconductor memory needs to increase, which runs counter to cost reduction. Since a capacity of the semiconductor memory necessary to store the data renewal information is about $1/1000$ of the whole data quantity and if it is considered that the cost of the semiconductor memory is several hundreds times high per unit storage capacity compared to the cost of the magnetic writing medium, the cost of the whole magnetic disk drive would increase about scores of percents.

SUMMARY OF THE INVENTION

According to an aspect of the present invention, there is proposed a magnetic disk drive including a temporary memory, which comprises the functions of adding, to data, a renewal frequency of data in a location (sector) when the data is to be written to the magnetic disk medium; storing the renewal frequency information in the temporary memory; and checking the renewal information stored in the temporary memory and that in the magnetic disk medium when the data is to be decoded.

The magnetic disk drive may further comprise the function of adding, to the data, information to determine whether or not both the renewal frequencies stored in the temporary memory and that stored in the magnetic disk medium are the same and storing a resulting data.

The magnetic disk drive may further comprise the function of deleting the renewal information stored in the temporary memory when it is determined as a result of the checking that both the renewal frequencies are the same.

The magnetic disk drive may further comprise the function of reporting to a host device (controller) that both the renewal frequencies do not accord or match when it is determined as a result of the checking that both the renewal information are not the same.

The magnetic disk drive may further comprise the function of adding (writing) to the data in the location (sector) of concern information indicating that the result of the checking is correct and the function of reproducing the information, which has been added to the data in the location of concern, to decode the data if the data renewal frequency information in the temporary memory has been deleted.

The magnetic disk drive may further comprise the function of, if it is determined from the information added to the data that both the renewal information are not the same, reporting this fact to the host device (controller).

The above means are used to perform the following processing. When data in a sector is to be renewed, information on the location of the sector of concern and the renewal frequency is stored in the temporary memory. In an idle state in which there is no access from the host device, the renewal information on the data added to the sector and the renewal information stored in the temporary memory are checked. When both coincide, the data is regarded as being not old and the sector information on the temporary memory is deleted, which allows the size of the temporary memory to be limited in use. Renewal mark information indicating that the renewal information has been checked is then added to the data in the sector and written.

Use of the above means reduces the capacity of the temporary memory, for example, a semiconductor memory that has stored the data renewal information, to required minimum ones. Therefore, a magnetic disk drive is provided that does not greatly influence the manufacturing cost and prevents old data from being read out.

Other objects, features and advantages of the invention will become apparent from the following description of the embodiments of the invention taken in conjunction with the accompanying drawings.

DESCRIPTION OF THE EMBODIMENTS

Figure 2:
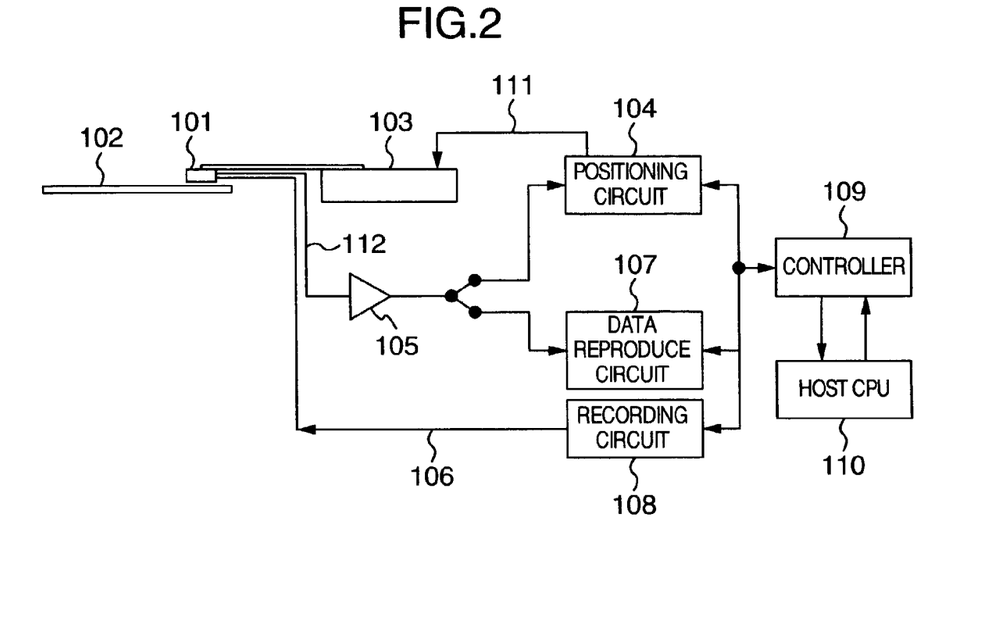
FIG. 2 is a block diagram of one example of the inventive magnetic disk drive.
Figure 5:
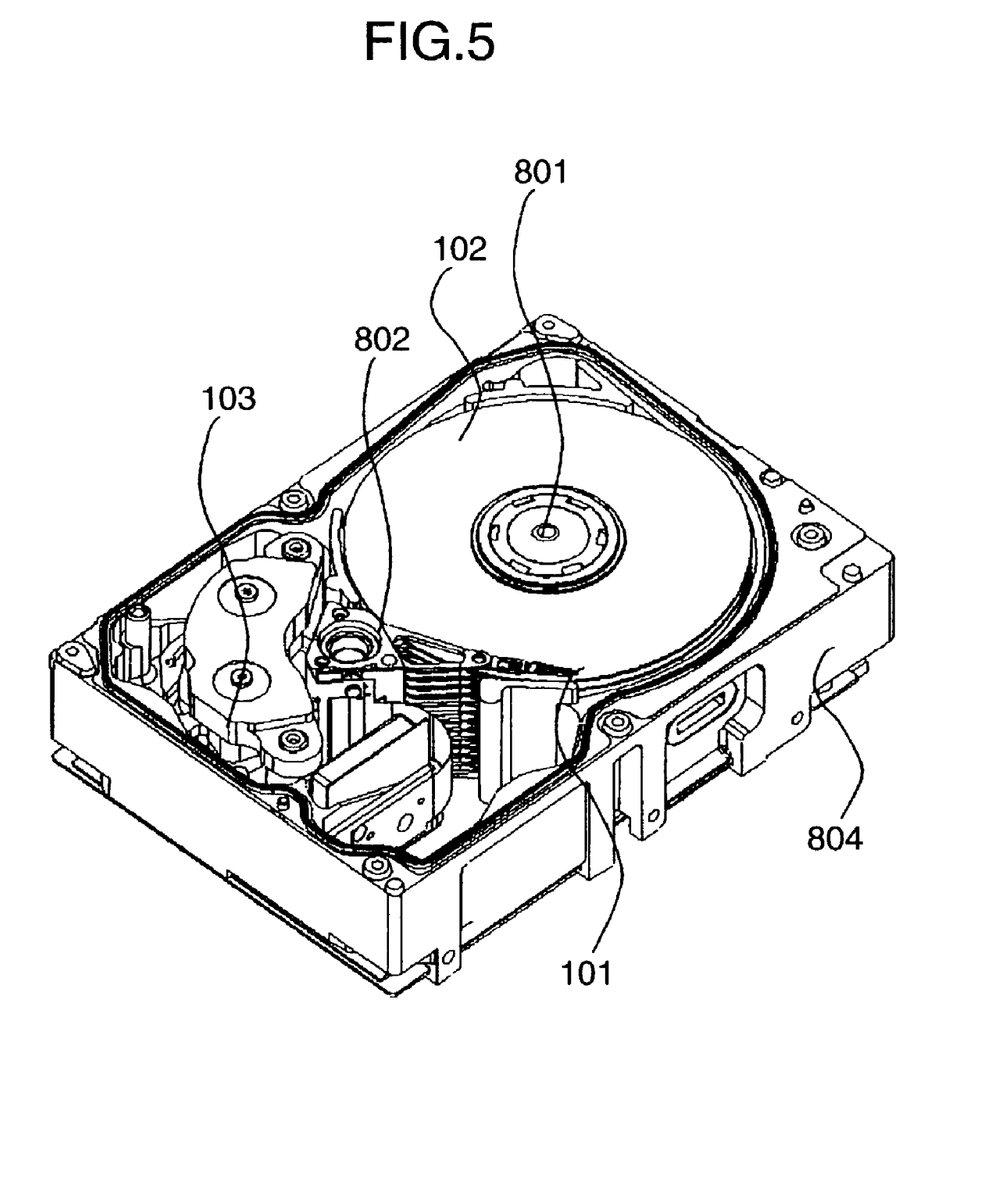
FIG. 5 illustrates one example of an appearance of a mechanism of the magnetic disk drive.

FIG. 2 is a block diagram of an overall magnetic disk drive according to the present invention. FIG. 5 is a perspective view of one example of the overall structure of the magnetic disk drive. Reference numeral 102 denotes a magnetic disk medium; 801 a spindle motor; 101 a magnetic head; 103 an actuator; 802 a magnetic-head support mechanism that includes head parts such as a head arm; and 804 a sealed housing. In FIG. 5, a cover (not shown) forming a main surface of the housing 804 is removed so that the inside of the housing 804 can be visually recognized.

Figure 3:
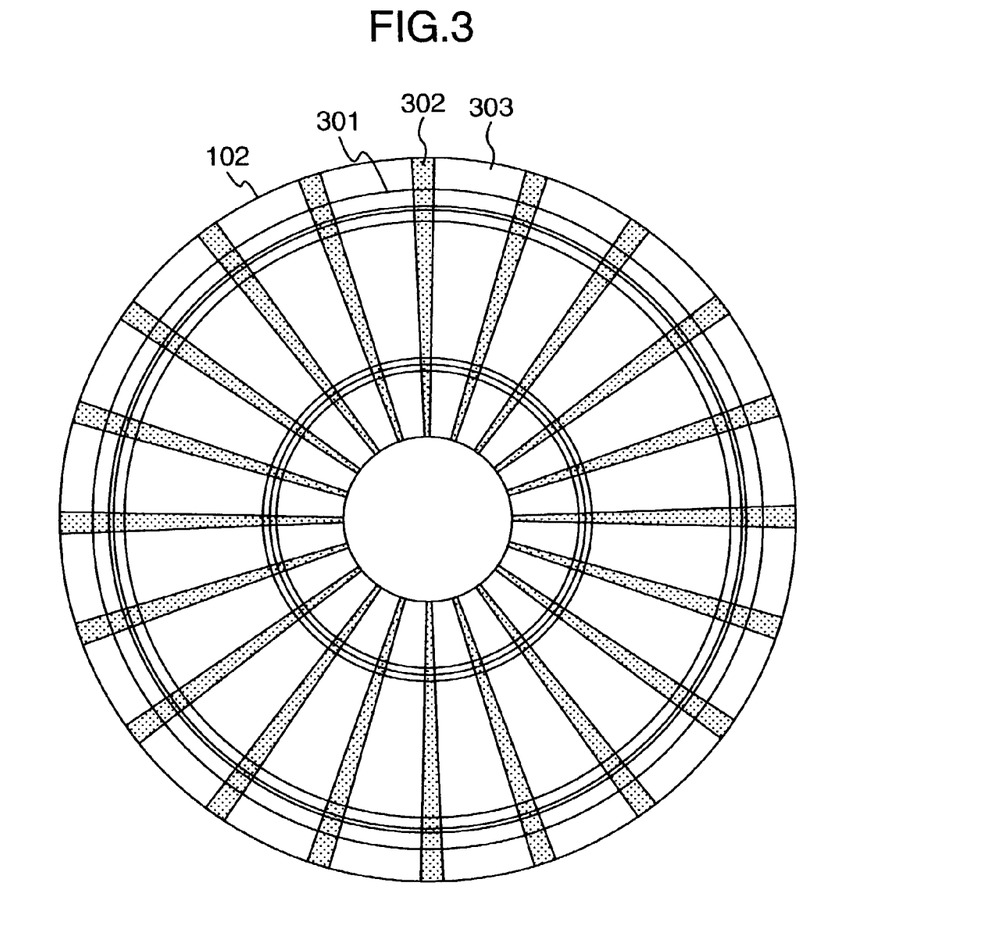
FIG. 3 schematically illustrates servo and data information writing areas of a magnetic disk medium.

The magnetic disk drive has a plurality of writing surfaces on each of which servo information is written to position the magnetic head 101 at a desired position. In an example of FIG. 3, a plurality of concentric tracks 301 are provided on a writing surface of the magnetic disk medium 102, on which respective tracks 301, data writing areas and position information writing areas are disposed in an intermixing manner along the periphery of the tracks. The servo information writing area 302 includes, for example, an area where track numbers to identify the respective tracks are stored, and an area where servo information is provided by which a positional deviation of the magnetic head 101 from the center of the track is to be known in the following operation of the magnetic head 101 on the track.

The magnetic disk medium 102 is rotated at a certain rotational speed by the spindle motor 801. Positional information that is used to position the magnetic head 101 at a desired position is reproduced (as a reproduced signal 112) by the magnetic head 101 floating while facing the medium 102, and delivered, via the head amplifier 105, positioning circuit 104 or data reproduce circuit 107, to the controller 109. Receiving a position control signal 111 from the positioning circuit 104, the actuator 103 positions the magnetic head 101 at a target position on the magnetic disk medium 102 by means of the magnetic-head support mechanism 802. A write signal 106 from the recording circuit 108 is delivered to the magnetic head 101.

Figure 4:
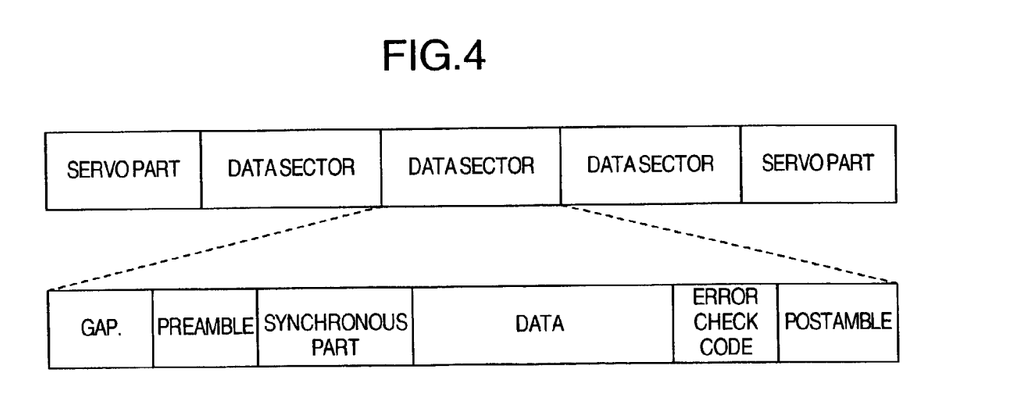
FIG. 4 schematically illustrates a data information writing area on a track on the magnetic disk medium.

FIG. 4 schematically illustrates a data writing area. Data is stored in one of sectors of a predetermined unit capacity. One or more sectors are present between servo information, each sector comprising a preamble, a synchronous part, a data part, an ECC (Error Check Code), and a postamble.

The magnetic head 101 positioned at the predetermined position transfers data received along with a command from the host CPU 110 to the recording circuit 108 and the magnetic head 101 via the disk controller 109 and writes the data therein. When data is to be read out, the signal sensed by the reproduce head is amplified by the head amplifier 105, decoded by the data reproduce circuit 107 and then delivered to the controller 109.

The controller 109 has a dedicated temporary memory in which data renewal information to be delivered to a sector is stored. The temporary memory may be provided in the controller or an external memory. The temporary memory is preferably a non-volatile one in order to prepare for an accidental interruption of the power supply and other possible unexpected happenings.

Figure 6:
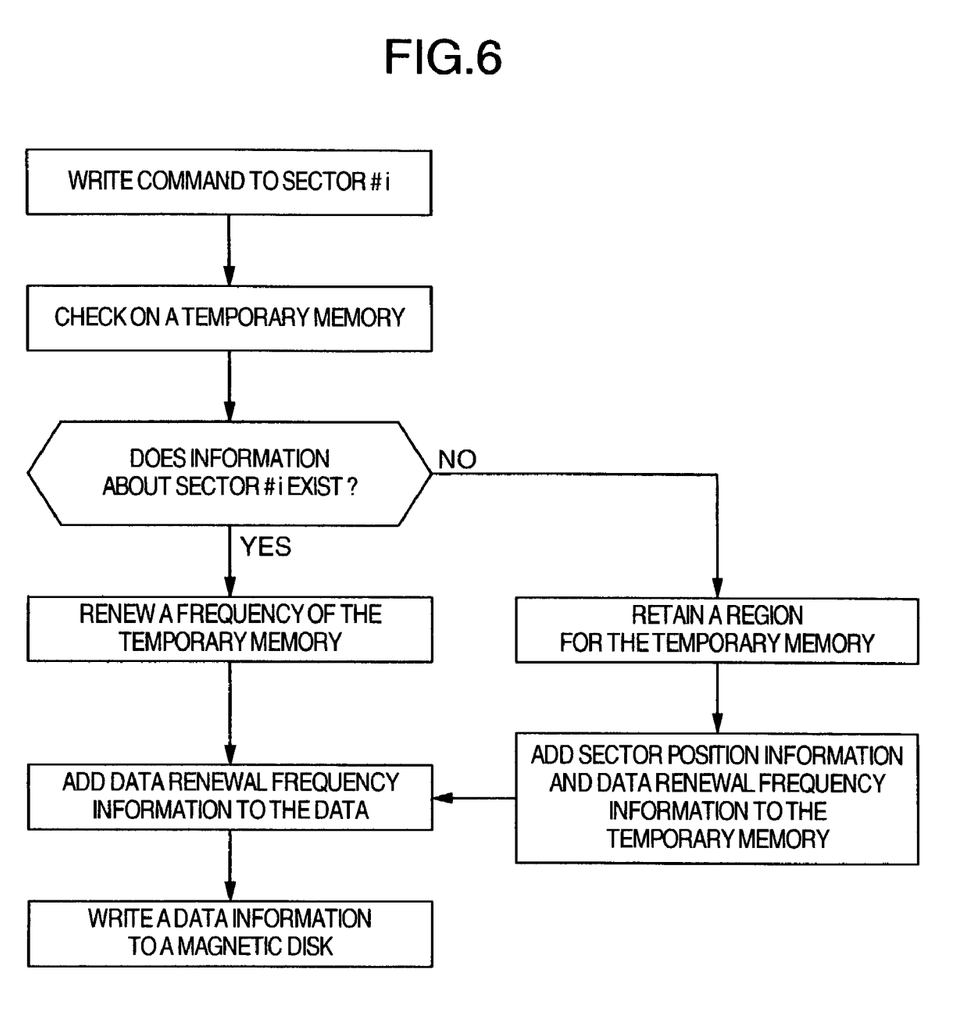
FIG. 6 is a flowchart of data writing in the inventive magnetic disk drive.

A flow of data writing in this embodiment is shown in FIG. 6. It is assumed here that the controller 109 is controlling a sequence of operations. A part or all of the operations may be performed by another electronic circuit. The data processing comprises two steps; i.e., writing and reading data. In an idle state in which no data processing is performed, data renewal is checked (hereinafter referred to as data checking).

First, a data write command is given, which commands to write data to a predetermined sector of the magnetic disk medium. Generally, serial numbers are given to the respective sectors where data are to be written. Assume now that an i th sector is selected.

It is then checked to see whether a renewal situation of the sector of concern has been written in the temporary memory. If so, data will be renewed in data writing to be performed this time. Therefore, the renewal information in the temporary memory is renewed. Data including this renewal information is also written to the magnetic disk medium. If there is no information in the i th sector in the temporary memory, an area where the data renewal situation in the i th sector is stored is retained in the memory to thereby write the renewal information. In addition, data including the renewal frequency information is written to the disk medium.

Figure 7:
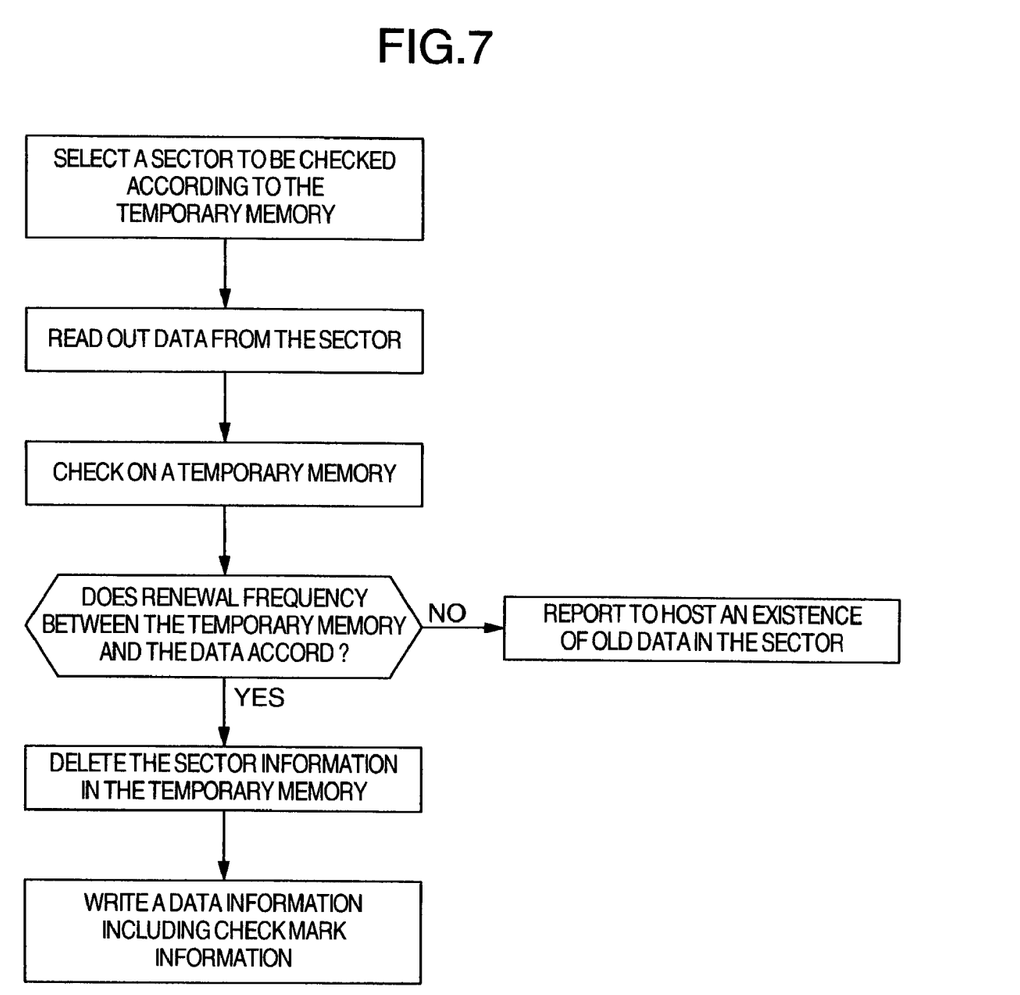
FIG. 7 is a flowchart of checking on renewal information in the inventive magnetic disk drive.

A process for checking a sector will be described next with reference to FIG. 7. First, a sector to be checked is selected from the temporary memory. Data is then read out from the sector. It is then checked to see whether the renewal situation between added one to the data and stored one in the temporary memory accords or matches.

If so, the sector information in the temporary memory is deleted and the retained area is then opened. Then, information including check mark information indicating that the appropriate sector is already checked is written and added to the sector.

Figure 1:
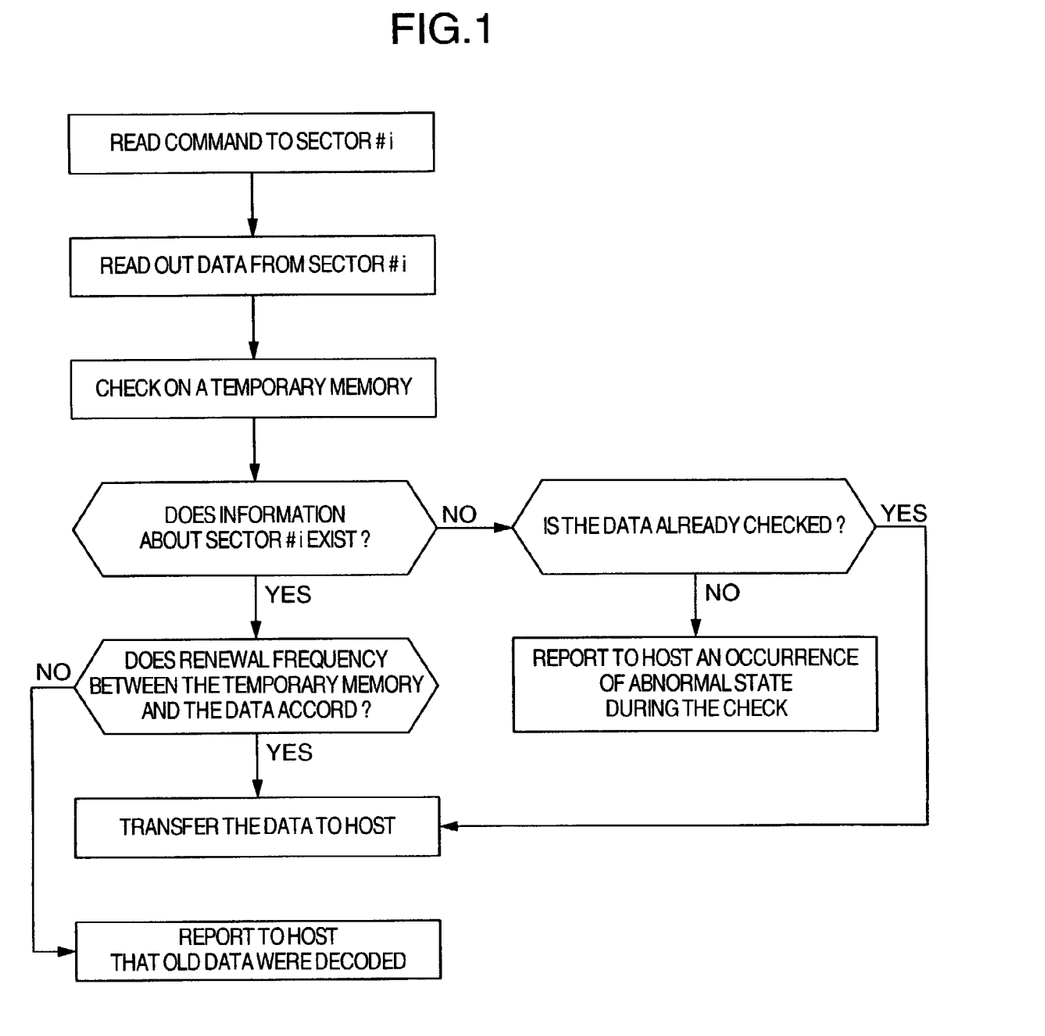
FIG. 1 is a flowchart of data reading in a magnetic disk drive according to the present invention.

A flow of data reproduction will be described next with reference to FIG. 1. After a read command for the i th sector information is issued, information is read out from the i th sector of the disk medium. The contents of the temporary memory are then checked and then it is checked to see whether the information in the i th sector is present in the temporary memory.

If so, it is then checked to see whether the renewal frequency information between the data and the temporary memory accords. If so, data has normally been read out and is then transferred to the host CPU.

If not, old data has been read out and it is reported to the host CPU that an error or old data has been read out.

In case of no sector information in the temporary memory, as a result of the checking in connection with the data reading operation, a state in which a new sector is to be used is excluded. Therefore, the data tried to read is considered correct, and to have been checked.

After data reading, if the information contained in the read data includes check mark information, the data is correct. Therefore, the data is directly transferred to the host CPU. If the data includes no check mark information, it means that data could not be correctly written in the checking step. Therefore, this fact is then reported to the host CPU.

Figure 8:
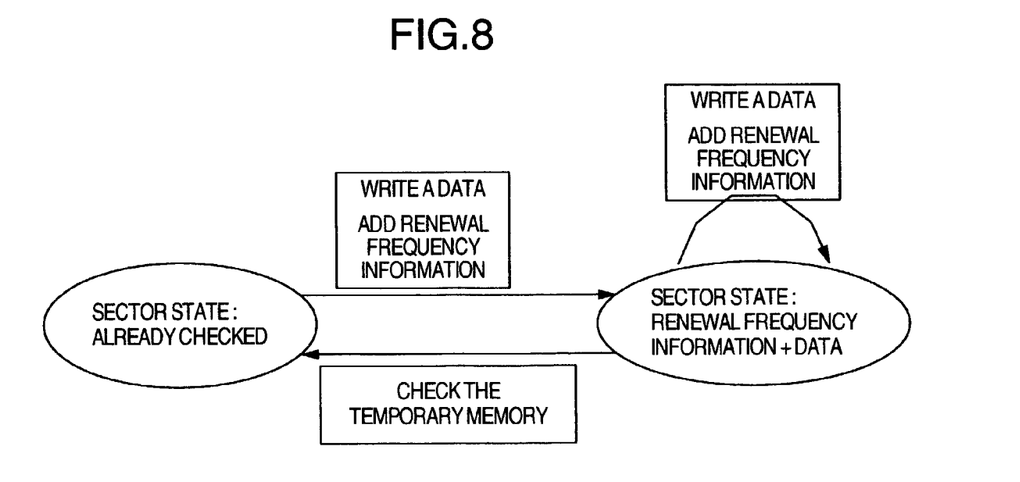
FIG. 8 schematically illustrates a state transition in a data sector in the inventive magnetic disk drive.

In the present embodiment, the overall data area is formatted before the magnetic disk drive starts to be used. At this time, information that the respective sectors are already checked is added to data in the sector so that no renewal frequency information is present in the temporary memory. After formatting, a state transition in the sector to which new data is to be written is shown in FIG. 8.

In the above example, any type of data renewal information will do, as long as it indicates what number of times the data has been written in on a certain sector. If a storage area for 3 bits is retained, it is possible to write data renewal information from the 0 th to 7 th time. The to 8 th writing of such information may be returned to the original 0 th time. Renewal information to be written to the disk medium may be contained anywhere in the data. Alternatively, the renewal frequency information may be converted to processing information, for example, a polynomial expression including the renewal information, and then written. Then, in decoding an inversely converted version of the data may be used.

According to this invention, reading old data is prevented without using a large amount of temporary memory and without deteriorating the writing and reading performance of the magnetic disk drive.

Having described a preferred embodiment of the invention with reference to the accompanying drawings, it is to be understood that the invention is not limited to the embodiments and that various changes and modifications could be effected therein by one skilled in the art without departing from the spirit or scope of the invention as defined in the appended claims.

What is claimed is:

1. A magnetic disk drive including a combination type magnetic head having a writing head and a reading head, a magnetic disk medium facing the combination type magnetic head, a mechanism for moving the magnetic head to a predetermined position on the magnetic disk medium, an electronic circuit having the function of reading or writing information, and a temporary memory, the magnetic disk drive comprising the operations of:
   when data is to be written to the magnetic disk medium, adding, to the data, renewal information indicating a renewal frequency of data in a writing location and writing the renewal information and the data to the magnetic disk medium;
   storing the renewal information in the temporary memory;
   checking to see whether the renewal information added to the data written to the magnetic disk medium and the renewal information stored in the temporary memory accord, where the renewal information is added for verifying overwrite of the data; and
   when it is determined as a result of the checking that both the renewal information are the same, deleting the renewal information in the temporary memory and releasing an area retained by the renewal information in the temporary memory; and
   where the checking and deleting are executed during an idle state and a read operation.

2. The magnetic disk drive according to claim 1, comprising the operation of:
   reporting to a host device that an error has occurred when it is determined as a result of the checking that both the renewal information are not the same.

3. The magnetic disk drive according to claim 2, comprising the operation of:
   writing, in the writing location, check mark information indicating that both the renewal information are not the same.

4. The magnetic disk drive according to claim 1, comprising the operation of:
   writing, in the writing location, check mark information indicating that both the renewal information are the same when it is determined as a result of the checking that both the renewal information are the same.

5. The magnetic disk drive according to claim 4, comprising the operation of:
   reproducing the check mark information when the data is to be reproduced.

6. A magnetic disk drive including a combination type magnetic head having a writing head and a reading head, a magnetic disk medium facing the combination type magnetic head, a mechanism for moving the magnetic head to a predetermined position on the magnetic disk medium, an electronic circuit having the function of reading or writing information, and a temporary memory, the magnetic disk drive comprising the operations of:
   before the magnetic disk drive starts to be used, adding check mark information to the magnetic disk medium, which indicates that respective sectors are already checked, and making no valid renewal information present in the temporary memory;
   when data is to be written to the magnetic disk medium, adding, to the data, renewal information indicating a renewal frequency of data in a writing location, and writing the renewal information and the data to the magnetic disk medium;
   storing the renewal information in the temporary memory;
   checking to see whether the renewal information added to the data written to the magnetic disk medium and the renewal information stored in the temporary memory accord, where the renewal information is added for verifying overwrite of the data; and
   when it is determined as a result of the checking that both the renewal information are the same, deleting the renewal information in the temporary memory and releasing an area retained by the renewal information in the temporary memory; and
   where the checking and deleting are executed during an idle state and a read operation.

7. The magnetic disk drive according to claim 6, comprising the operation of:
  reporting to a host device that an error has occurred when it is determined as a result of the checking that both the renewal information are not the same.

8. The magnetic disk drive according to claim 7, comprising the operation of:
  writing, in the writing location, check mark information indicating that both the renewal information are not the same.

9. The magnetic disk drive according to claim 6, comprising the operation of:
  writing, in the writing location, check mark information indicating that both the renewal information are the same when it is determined as a result of the checking that both the renewal information are the same.

10. The magnetic disk drive according to claim 9, comprising the operation of:
  reproducing the check mark information when the data is to be reproduced.

11. A magnetic disk drive comprising a combination type magnetic head having a writing head and a reading head, a magnetic disk medium facing the combination type magnetic head, a mechanism for moving the magnetic head to a predetermined position on the magnetic disk medium, an electronic circuit having the function of reading or writing information, and a temporary overwrite-verification memory, the magnetic disk drive comprising the operations of:
  when data is to be written to the magnetic disk medium, adding, to the data, predetermined renewal information, and writing the renewal information and the data to the magnetic disk medium, and storing a verification copy of the renewal information in the temporary overwrite-verification memory;
  responsive to a subject write to the magnetic disk medium, checking to see whether the renewal information added to the data written to the magnetic disk medium and the renewal information stored in the temporary overwrite-verification memory for the subject write accord;
  when it is determined as a result of the checking that both the renewal information are the same for the subject write, deleting every occurrence of the renewal information pertaining to the subject write in the temporary overwrite-verification memory and releasing an area retained by the renewal information in the temporary overwrite-verification memory for use with subsequent writes to the magnetic disk medium; and
  writing, in the writing location, check mark information indicating that both the renewal information for the subject write are the same when it is determined as a result of the checking that both the renewal information are the same.

12. The magnetic disk drive according to claim 11, comprising the operation of:
  reporting to a host device that an error has occurred when it is determined as a result of the checking that both the renewal information for the subject write are not the same.

13. The magnetic disk drive according to claim 12, comprising the operation of:
  writing, in the writing location, check mark information indicating that both the renewal information for the subject write are not the same.

14. The magnetic disk drive according to claim 11, comprising the operation of:
  reproducing the check mark information when the data is to be reproduced.

15. The magnetic disk drive according to claim 11, wherein the checking and deleting are executed during either one of an idle state and a read operation following the writing of the renewal information and the data to the magnetic disk medium for the subject write.

16. A magnetic disk drive comprising a combination type magnetic head having a writing head and a reading head, a magnetic disk medium facing the combination type magnetic head, a mechanism for moving the magnetic head to a predetermined position on the magnetic disk medium, an electronic circuit having the function of reading or writing information, and a temporary overwrite-verification memory, the magnetic disk drive comprising the operations of:
  before the magnetic disk drive starts to be used, adding predetermined check mark information to the magnetic disk medium, which indicates that respective sectors are already checked, and making no valid renewal information present in the temporary overwrite-verification memory;
  when data is to be written to the magnetic disk medium, adding, to the data, predetermined renewal information, and writing the renewal information and the data to the magnetic disk medium, and storing a verification copy of the renewal information in the temporary overwrite-verification memory;
  responsive to a subject write to the magnetic disk medium, checking to see whether the renewal information added to the data written to the magnetic disk medium and the renewal information stored in the temporary overwrite-verification memory for the subject write accord;
  when it is determined as a result of the checking that both the renewal information are the same for the subject write, deleting every occurrence of the renewal information pertaining to the subject write in the temporary overwrite-verification memory and releasing an area retained by the renewal information in the temporary overwrite-verification memory for use with subsequent writes to the magnetic disk medium; and
  writing, in the writing location, check mark information indicating that both the renewal information for the subject write are the same when it is determined as a result of the checking that both the renewal information are the same.

17. The magnetic disk drive according to claim 16, comprising the operation of:
  reporting to a host device that an error has occurred when it is determined as a result of the checking that both the renewal information for the subject write are not the same.

18. The magnetic disk drive according to claim 17, comprising the operation of:
  writing, in the writing location, check mark information indicating that both the renewal information for the subject write are not the same.

19. The magnetic disk drive according to claim 16, comprising the operation of:
  reproducing the check mark information when the data is to be reproduced.

20. The magnetic disk drive according to claim 16, wherein the checking and deleting are executed during either one of an idle state and a read operation following the writing of the renewal information and the data to the magnetic disk medium for the subject write.

* * * * *